United States Patent [19]
Nagel

[11] Patent Number: 6,095,186
[45] Date of Patent: *Aug. 1, 2000

[54] PLURAL VALVE SEATING ARRANGEMENT

[75] Inventor: Heinz M. Nagel, Daun, Germany

[73] Assignee: Arca Regler GmbH, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/092,093

[22] Filed: Jun. 5, 1998

[51] Int. Cl.$^7$ .................................................. F16K 25/00
[52] U.S. Cl. ...................................... 137/516.29; 251/210
[58] Field of Search ....................... 251/210; 137/516.29, 137/516.27

[56] References Cited

U.S. PATENT DOCUMENTS

| | | |
|---|---|---|
| 2,485,092 | 10/1949 | Gannon . |
| 2,645,449 | 7/1953 | Gulick . |
| 3,051,196 | 8/1962 | Miller ................................. 137/516.29 |
| 3,110,320 | 11/1963 | Rosenberger . |
| 3,123,091 | 3/1964 | Elsey . |
| 3,318,577 | 5/1967 | Banks . |
| 3,428,076 | 2/1969 | Lowe . |
| 3,583,426 | 6/1971 | Feres . |
| 4,190,073 | 2/1980 | Claycomb . |
| 4,362,185 | 12/1982 | Kadner ................................. 137/516.29 |
| 4,691,734 | 9/1987 | Fort . |
| 5,618,025 | 4/1997 | Barron et al. .............................. 251/210 |
| 5,785,082 | 7/1998 | Geis et al. ............................ 137/516.29 |

FOREIGN PATENT DOCUMENTS

| | | |
|---|---|---|
| 2742206 | 6/1997 | France . |
| 1048454 | 1/1959 | Germany . |
| 1068073 | 10/1959 | Germany . |
| 1142482 | 1/1963 | Germany . |
| 1152857 | 8/1963 | Germany . |
| 9320564 | 10/1994 | Germany . |
| 1395106 | 3/1998 | Germany . |

OTHER PUBLICATIONS

Willi Dannemann, "Achema: Rohrleitungsarmaturen und Rohrleitungselemente", MM Maschinenmarkt 1979, pp. 1385–1388.

*Primary Examiner*—Kevin Lee
*Attorney, Agent, or Firm*—Liniak, Berenato, Longacre & White, LLC

[57] ABSTRACT

A valve arrangement comprises a valve housing and a shutoff device. The valve housing has a flowthrough passage extending between an inflow opening and an outflow opening. The shutoff device is for closing the flowthrough passage. The shutoff device has a valve seat surrounding the flowthrough passage and a valve cone which is movable in an axial direction perpendicular to the valve seat between an open valve position and a closed valve position. The valve cone corresponds with the valve seat such that, in the closed valve position, sealing surfaces on the valve cone and valve seat come into metallically sealing contact and thus close off the flowthrough passage. Arranged between the valve seat and the valve cone is a soft-sealing seal arrangement which, in the closed valve position, provides an effective seal in addition to the metallic seal effected by the sealing surfaces. The soft-sealing seal arrangement has a sealing element retained on the valve seat. This sealing element is positioned so that, during a closing operation, the valve cone comes into contact against the sealing element before the closed valve position is reached, and as the closing operation proceeds, the sealing element presses against an elastic return force in the direction of the valve seat. The sealing element is configured as an annular disk which in the region of its outer rim is retained on the valve seat and in the region of its inner rim is supported elastically on the valve seat.

5 Claims, 4 Drawing Sheets

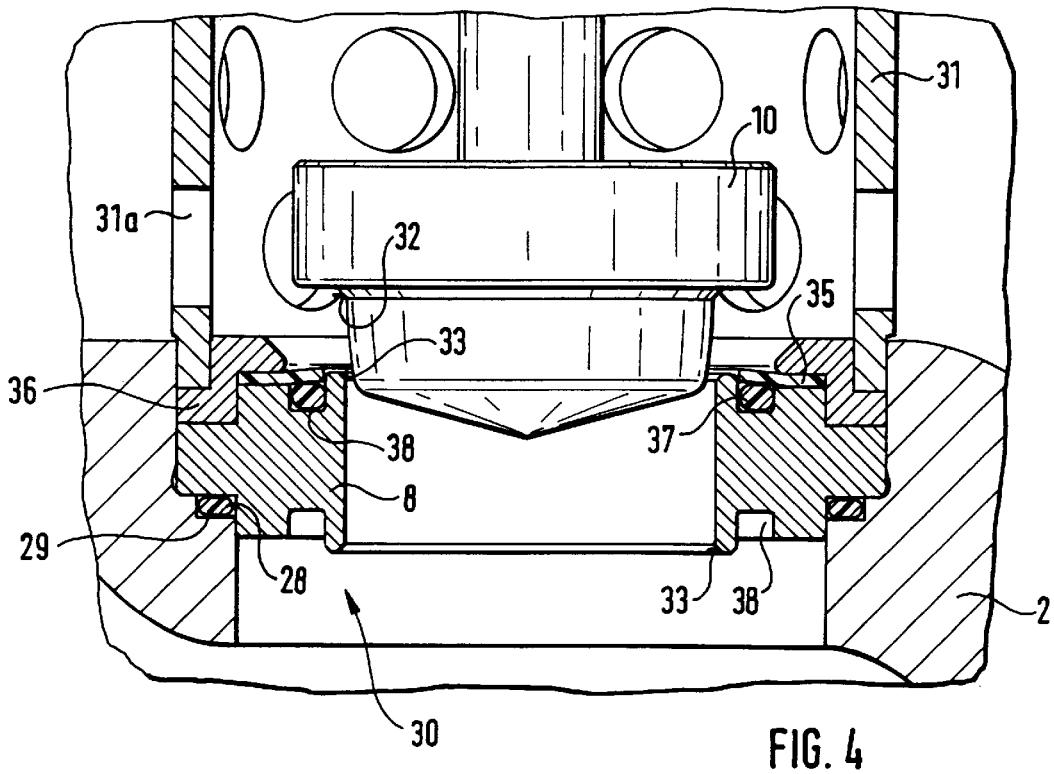
FIG. 4
FIG. 5
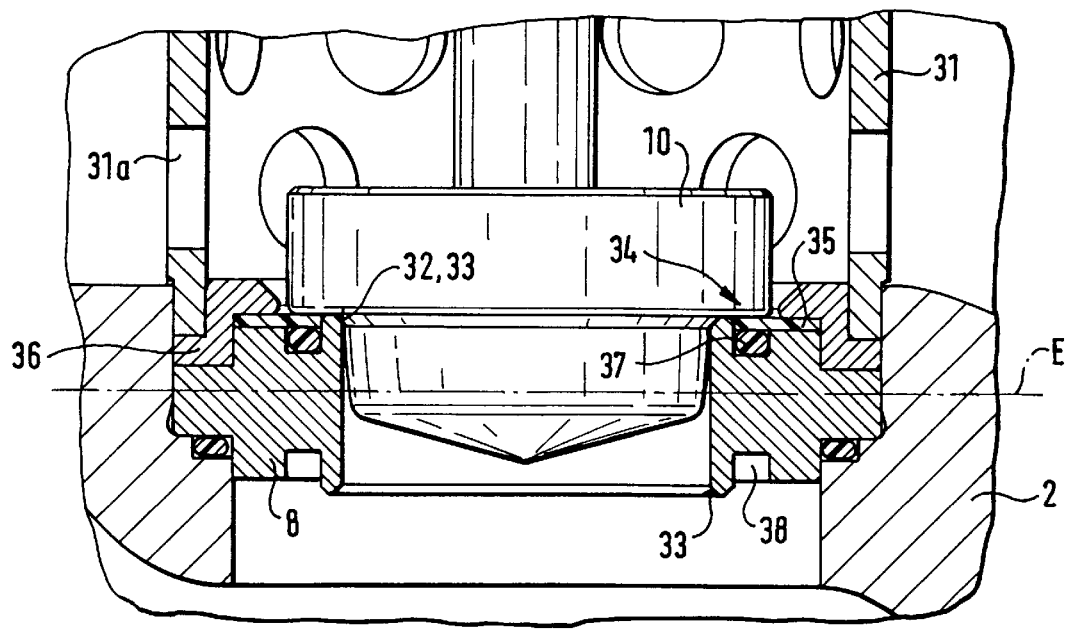

PLURAL VALVE SEATING ARRANGEMENT

BACKGROUND OF THE INVENTION

The present invention concerns a valve arrangement having a valve housing which has a flowthrough passage extending between an inflow opening and an outflow opening; and having a shutoff device, for closing the flowthrough passage, which has a valve seat surrounding the flowthrough passage and a valve cone which is movable in an axial direction perpendicular to the valve seat between an open and a closed valve position and corresponds with the valve seat such that in the closed valve position, sealing surfaces on the valve cone and valve seat come into metallically sealing contact and thus close off the flowthrough passage.

Valve arrangements of this type, which are configured in particular as regulating valves, can be of various configurations depending on their application, differing in particular in terms of the embodiment of the sealing surfaces. On the one hand, the sealing surfaces can be of various forms, generally having a conical sealing surface. Embodiments are also known, however, in which the sealing surfaces rest in planar fashion against one another.

In addition, different materials are used for the sealing surfaces depending on the type of stress. For low stresses at which even soft-sealing cones can be used, the sealing edges are not particularly protected. For moderate stresses the sealing edges are stellite-coated, and for high stresses the entire contour is armored. For particularly high stresses, internal fittings can be made of ceramic, hard metal, or hardened materials.

In the context of the present invention, the term "metallically sealing" is to be understood in contrast to so-called soft-sealing arrangements, and in particular is not limited to the use of metallic materials but also encompasses arrangements in which the sealing surfaces are configured from other hard materials such as, for example, ceramic, along with so-called metallically ground seals.

In the power-generation sector in particular, or in chemical plants, it is necessary to minimize the leakage flow rate, i.e. the flow volume which passes between the valve seat and valve cone and between the valve seat and housing when the valve is closed.

In particular, it is often required that the leakage flow rate be equal to zero. This requirement often can no longer be met after an extended operating period, since the sealing surfaces are in some cases exposed to very severe stresses due to erosion, abrasion, cavitation, etc., so that it becomes necessary to rework the sealing surfaces. This represents a laborious procedure, however, and in particular can also lead to undesirable shutdowns of the facility into which they are incorporated.

SUMMARY OF THE INVENTION

It is therefore the object of the invention to create a valve arrangement of the kind cited initially in which no leakage occurs between valve seat and valve cone even after an extended operating period.

According to the invention this object is achieved in that there is arranged between valve seat and valve cone a soft-sealing seal arrangement which, in the closed valve position, is effective in addition to the metallic seal effected by the sealing surfaces. In the case of the valve arrangement according to the invention, sealing is accomplished in the conventional manner by means of the sealing surfaces on the valve cone and valve seat, which come into metallically sealing contact with the valve in the closed position. Additionally, however, a soft-sealing seal arrangement is provided which can collect leaks that occur at the metallic seal, so that the valve arrangement according to the invention seals perfectly even if the metallic seal no longer operates perfectly due to erosion, abrasion, or cavitation. In this context, because of the mechanical support on the metallic sealing edge, the soft-sealing seal arrangement is exposed to only minor loads, so that it has a long life expectancy.

In an embodiment of the invention, provision is made for the seal arrangement to have a sealing element, retained on the valve, which is positioned so that during a closing operation the valve cone comes into contact against the sealing element before it reaches the closed valve position, and as the closing operation proceeds the sealing element presses against an elastic return force in the direction of the valve seat. In this context, the sealing element itself can exhibit the necessary elasticity. In an embodiment of the invention, however, provision is made for the sealing element to consist of a material having a low elasticity, and to be supported on the valve seat by an elastic element.

Preferably the sealing element used is made of a PTFE material which possesses very good sealing properties and is very resistant. The sealing element can, for example, be configured as an annular disk which in the region of its outer rim is retained on the valve seat and in the region of its inner rim is supported elastically on the valve seat. The use of an annular disk made of PTFE has the advantage that the annular disk can be used on both sides.

The elastic element used can be, for example, a spring element or an O-ring made of an elastomeric material that is retained in an annular groove in the valve seat.

BRIEF DESCRIPTION OF THE DRAWINGS

Regarding further advantageous embodiments and developments of the invention, reference is made to the following description of an exemplifiing embodiment referring to the appended drawings, in which:

FIG. 4 shows an enlarged detail depiction of the valve seat and valve cone in the open valve position;

FIG. 5 shows an enlarged detail depiction of the valve seat and valve cone in the closed valve position.

DESCRIPTION OF PREFERRED EMBODIMENTS

Figure 1:
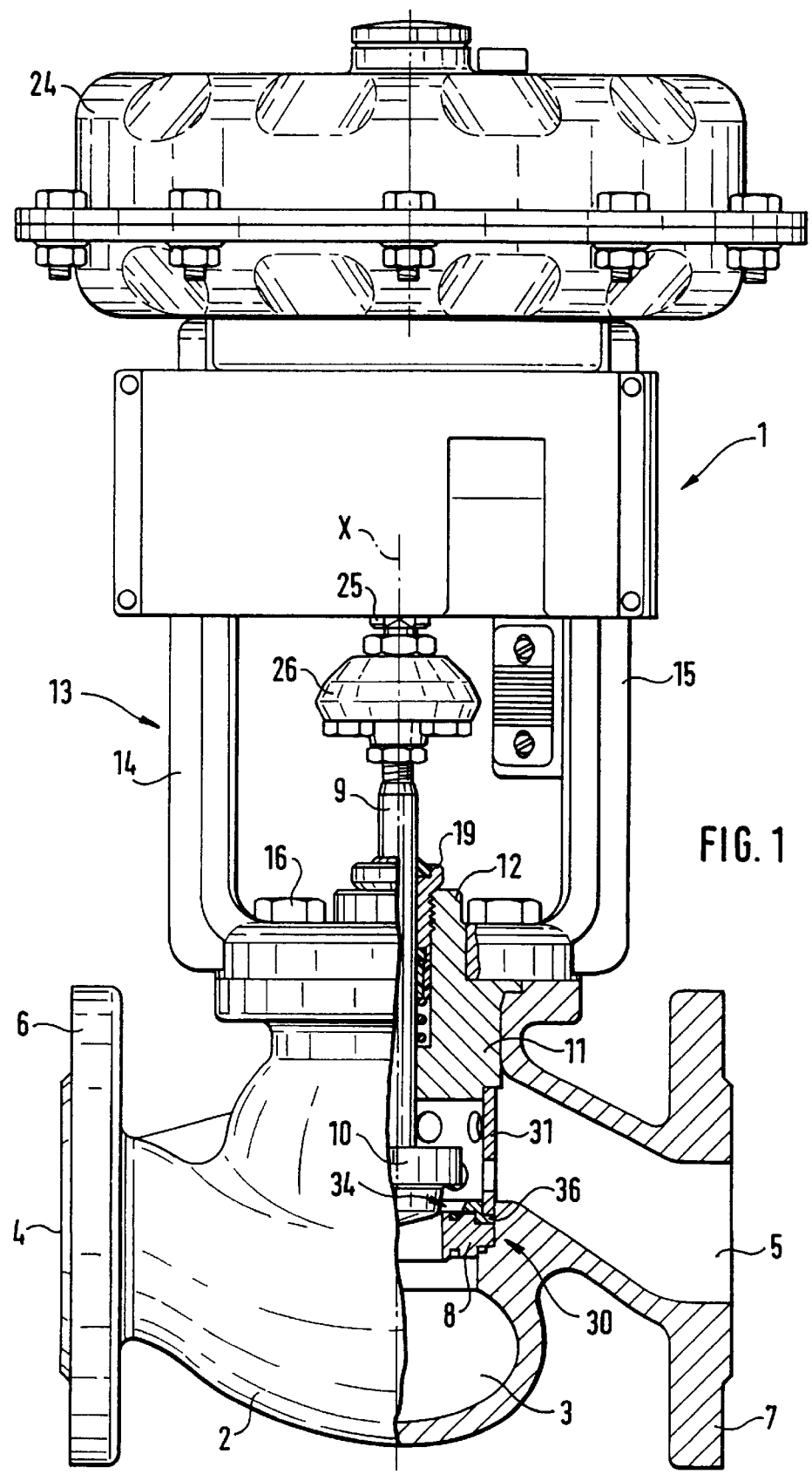
FIG. 1 shows, in a partially sectioned side view, a valve arrangement according to the present invention in the open valve position.
Figure 2:
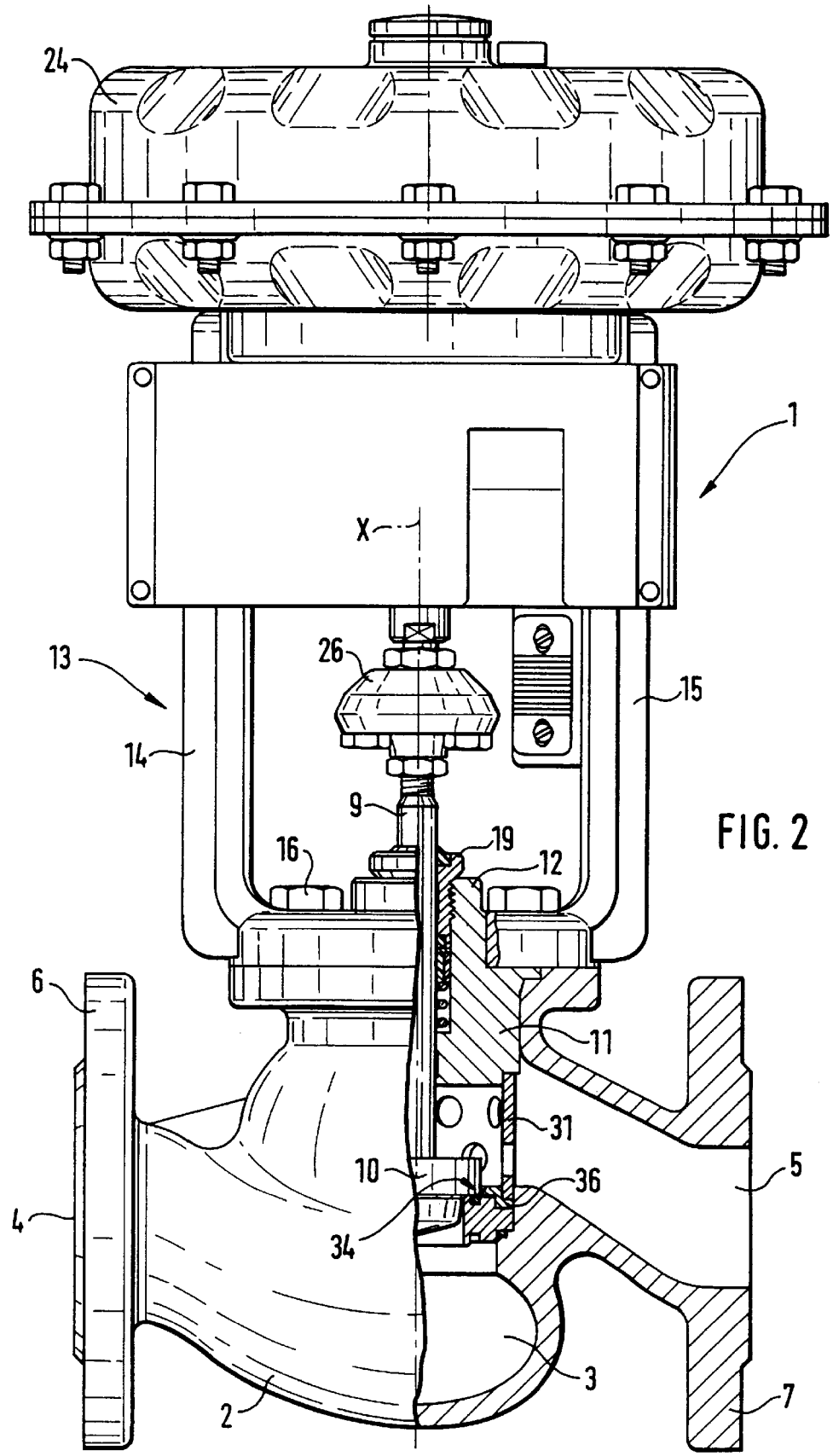
FIG. 2 shows, in a partially sectioned side view, the valve arrangement of FIG. 1 in the closed valve position.
Figure 3:
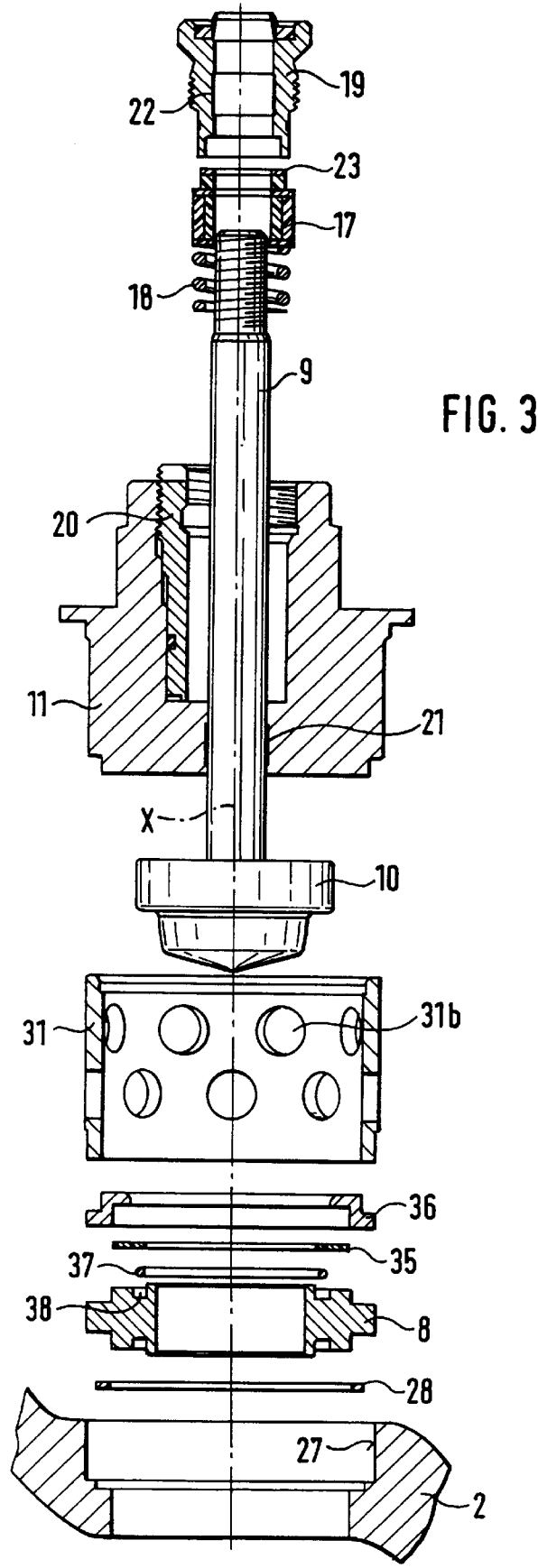
FIG. 3 shows, in an exploded view, those components of the valve arrangement of FIG. 1 that are essential to the invention.

FIGS. 1 and 2 depict a valve arrangement according to the present invention, configured as a regulating valve 1. Regulating valve 1 has a valve housing 2 in which a flowthrough passage 3 extends between an inflow opening 4 and an outflow opening 5 of valve housing 2. By means of attachment flanges 6, 7 which are arranged around inflow opening 4 and outflow opening 5, regulating valve 1 can be installed between the ends of two pipes and thus into a pipework system. Flowthrough passage 3 then serves to convey the medium to be controlled.

A horizontally arranged valve seat 8, through which flowthrough passage 3 passes, is built into valve housing 2.

Extending upward concentrically around valve seat 8 is a valve rod 9 whose lower end is configured as valve cone 10. Valve cone 10 corresponds with valve seat 8 such that in its lowest position, valve cone 10 rests on valve seat 8 and thus closes off flowthrough passage 3 in a manner to be described in more detail later. Valve rod 9 is guided in a cover 11 which closes off flowthrough passage 3 at the top and is bolted sealingly to valve housing 2. Cover 11 has an extension 12, projecting upward, which serves to center a yoke 13 having vertically extending yoke struts 14, 15. Yoke is secured to valve housing 2 by means of clamping bolts 16 in a manner yet to be described.

Cover 11 constitutes, between its inner wall and the outside of valve rod 9, a cylindrical cavity into which a spindle seal 17, such as a PTFE V-ring or a stuffing box packing is inserted and is retained in axially preloaded fashion between a helical spring 18 and a bolt 19. Bolt 19 is threaded into a stainless steel sleeve 20 which in turn is threaded into cover 11 and extends between cover 11 and spindle seal 17. The tension is set so as on the one hand to guarantee good sealing, and on the other hand still to ensure sufficiently low friction on valve rod 9.

Maintenance-free seal elements 21, 22 are moreover provided between valve rod 9 and cover 11 on the one hand, and valve rod 9 and bolt 19 on the other hand. In addition, a precision seal element 23 is arranged between spindle seal 17 and stuffing box bolt 19.

Arranged at the upper end of yoke 13 is an actuating drive 24 in the form of a diaphragm actuating motor which actuates a drive rod 25 which is joined to the upper end of valve rod 9 via a coupling 26, so that valve rod 9 can be axially displaced by means of actuating drive 24 between the open valve position depicted in FIG. 1 and the closed valve position depicted in FIG. 2.

The construction of the valve arrangement in the region of valve seat 8 is depicted in detail in FIGS. 4 and 5. Valve seat 8 is of annular configuration and is laid unconstrainedly into a recess 27 of the valve housing, and positioned radially in said recess 27. Arranged between valve seat 8 and valve housing 2 is a sealing ring 28 which is laid into a groove 29 in recess 27.

Valve seat 8 is axially secured in recess 27 by means of a clamping device 30. In this context, axial immobilization is accomplished by means of a spacer tube 31 which is clamped against valve seat 8 on a shunted-force basis by yoke 13 that rests against and is immovably bolted to valve housing 2, with cover 11 interposed. This arrangement guarantees that no radial forces act on valve seat 8 when valve seat 8 is immobilized; furthermore, the clamping force can be accurately established by appropriate dimensioning of the components located in the force path.

Valve seat 8 has at its inner edge, facing valve cone 10, a sealing surface 33 which comes into metallically sealing contact with a corresponding sealing surface 32 on valve cone 10 in the closed valve position depicted in FIG. 5, in order to close off flowthrough passage 3.

Additionally provided between valve seat 8 and valve cone 10 is a soft-sealing seal arrangement 34 which, in the closed valve position, is effective in addition to the metallic seal. The soft-sealing seal arrangement is constituted by an annular disk 35 made of PTFE (Teflon), which at its outer rim is locked in place on valve seat 8 by a clamping ring 36 which is immobilized between valve seat 8 and spacer tube 31, and in its interior region is supported by an O-ring 37 made of an elastomeric material which is laid into an annular groove 38 in valve seat 8.

As is evident from FIG. 4, annular disk 35 is configured so that its inner rim facing toward valve cone 10 projects beyond valve seat 8, so that during a closing operation valve cone 10 first comes into contact with that inner rim, and as closing proceeds, annular disk 35 presses downward against the elastic return force of O-ring 37 so that in the closed valve position shown in FIG. 5, annular disk 35 and valve cone 10 rest in planar contact against one another. The annular gap between valve seat 8 and valve cone 10 around metallic sealing surfaces 32 and 33 is thus closed off in soft-sealing fashion. Since valve cone 10 is substantially supported against valve 8 in the region of the metallic seal, PTFE annular disk 35 is not loaded beyond the allowable surface pressure, so that it is very durable. When the valve arrangement is once again brought into the open valve position, PTFE annular disk 35 is brought back, by the return force of O-ring 37, into the position shown in FIG. 4.

If wear should nevertheless occur on annular disk 35, it can easily be replaced. As is clearly evident from FIGS. 4 and 5, valve seat 8 is configured symmetrically with respect to its center plane E lying perpendicular to axis X. This offers the advantage that valve seat 8 can easily be rotated so as to make a new seal arrangement available.

I claim:

1. A valve arrangement comprising:

a valve housing which has a flowthrough passage extending between an inflow opening and an outflow opening; and a shutoff device for closing the flowthrough passage, said shutoff device having a valve seat surrounding the flowthrough passage and a valve cone which is movable in an axial direction perpendicular to the valve seat between an open valve position and a closed valve position and which corresponds with the valve seat such that, in the closed valve position, sealing surfaces on the valve cone and valve seat come into metallically sealing contact and thus close off the flowthrough passage, wherein there is arranged between the valve seat and the valve cone a soft-sealing seal arrangement which, in the closed valve position, provides an effective seal in addition to the metallic seal effected by the sealing surfaces;

wherein the soft-sealing seal arrangement has a sealing element retained on the valve seat, said sealing element being positioned so that:

during a closing operation the valve cone comes into contact against the sealing element before the closed valve position is reached, and as the closing operation proceeds, the sealing element presses against an elastic return force in the direction of the valve seat; and wherein the sealing element is configured as an annular disk which in the region of its outer rim is retained on the valve seat and in the region of its inner rim is supported elastically on the valve seat.

2. The valve arrangement as defined in claim 1, wherein the seal arrangement is arranged around the sealing surfaces.

3. The valve arrangement as defined in claim 1, wherein the sealing element consists of a material having a low elasticity, and is supported on the valve seat by an elastic element.

4. The valve arrangement as defined in claim 3, wherein the sealing element consists of a PTFE material.

5. The valve arrangement as defined in claim 3, wherein the elastic element is an O-ring made of an elastomeric material.

* * * * *